R. A. L. VOLET.
DYNAMIC BALANCING MACHINE.
APPLICATION FILED OCT. 13, 1919.
1,401,838.
Patented Dec. 27, 1921.
3 SHEETS—SHEET 1.
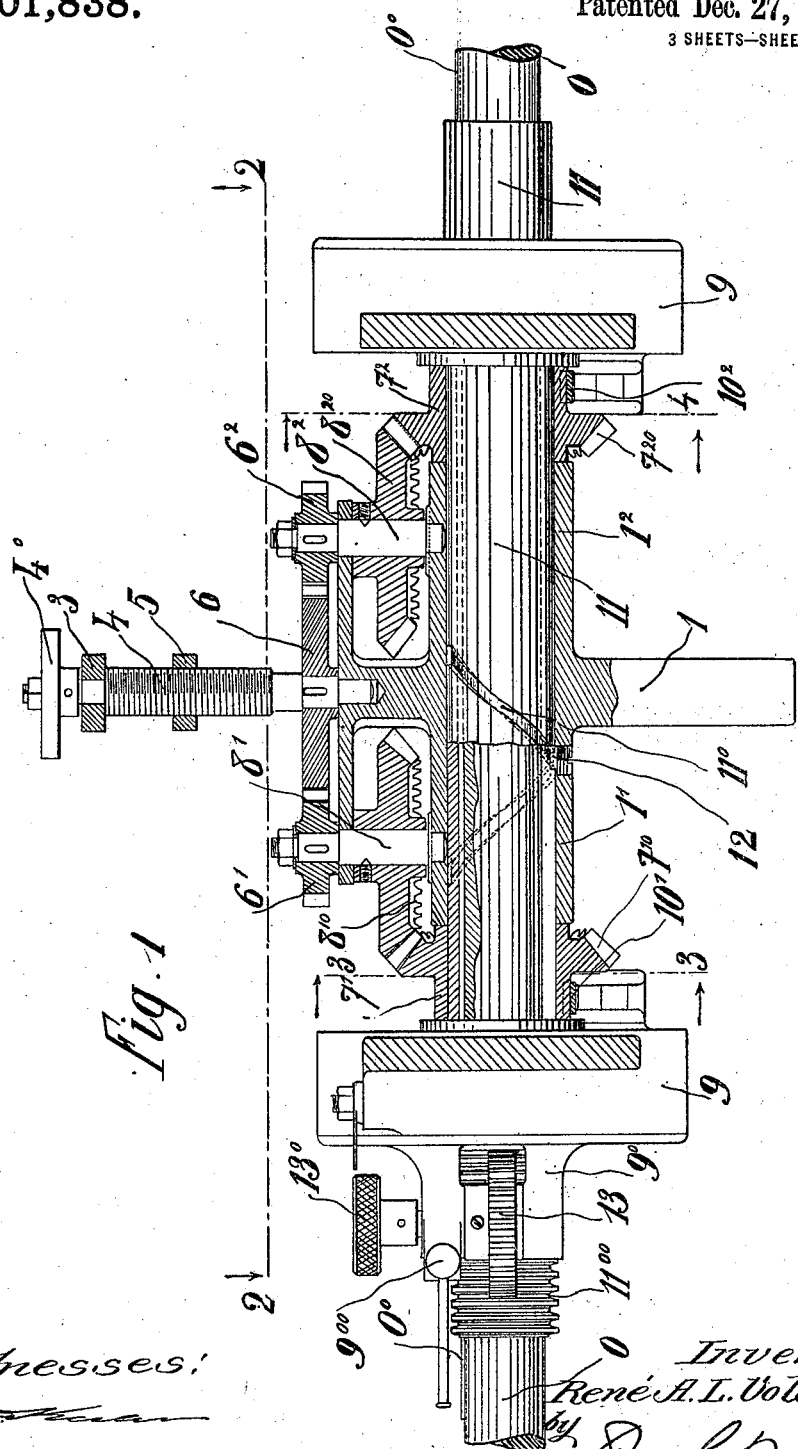
Witnesses:
Inventor
René A. L. Volet

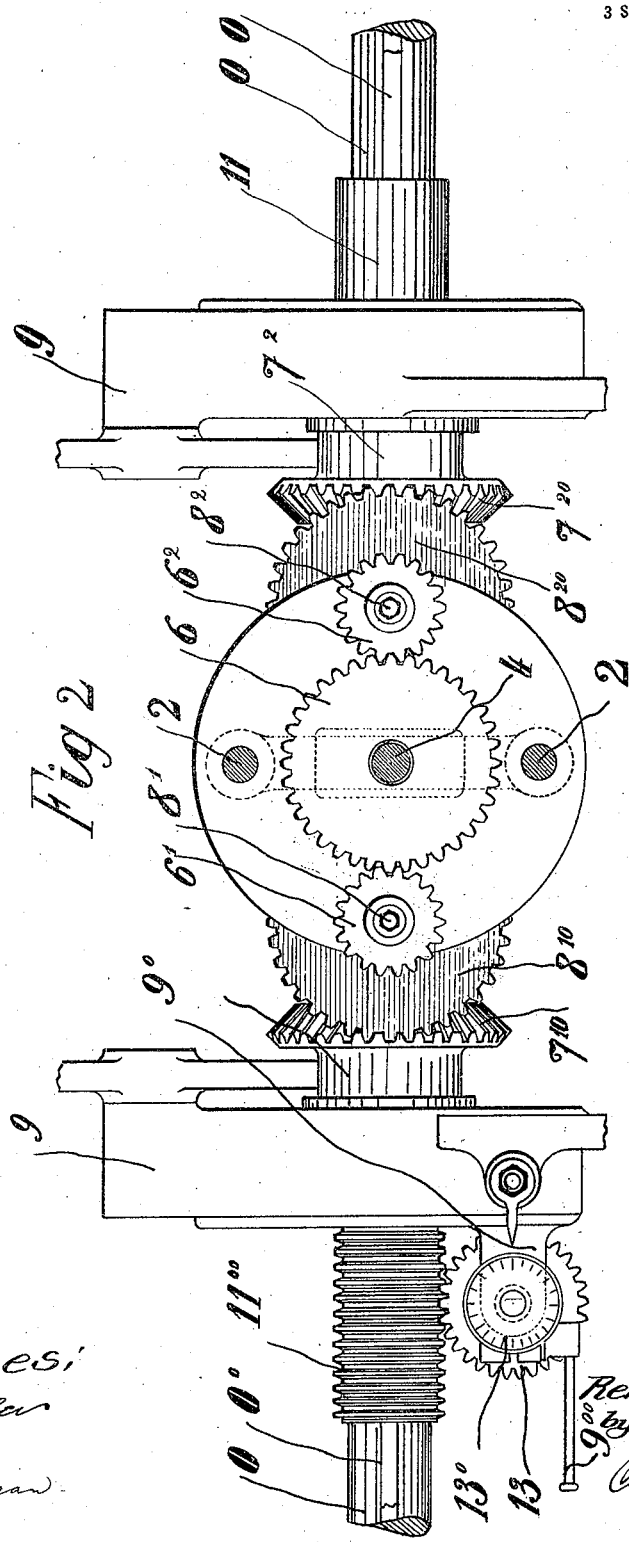

R. A. L. VOLET.
DYNAMIC BALANCING MACHINE.
APPLICATION FILED OCT. 13, 1919.
1,401,838.
Patented Dec. 27, 1921.
3 SHEETS—SHEET 3.
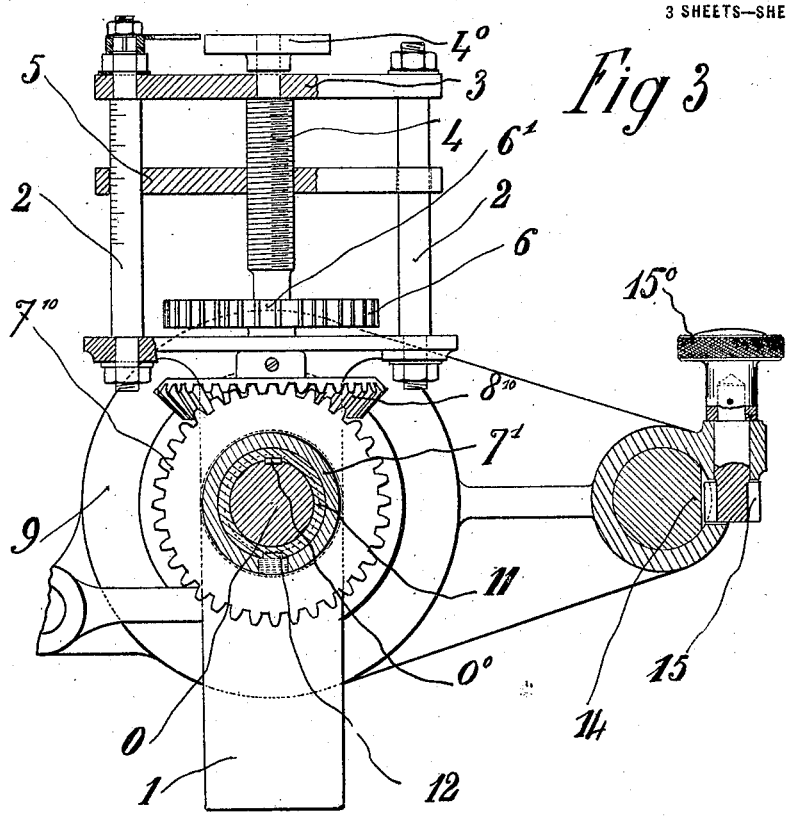
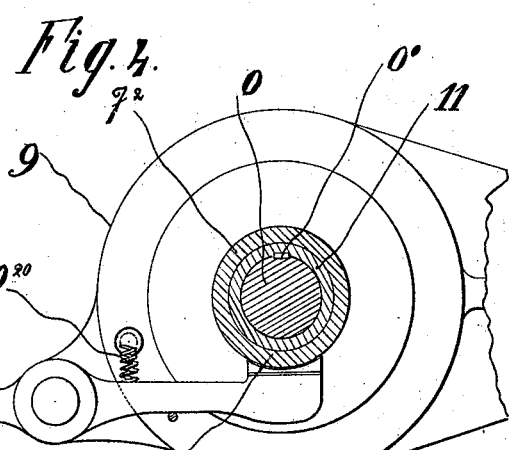

UNITED STATES PATENT OFFICE.

RENÉ ALFRED LAURENT VOLET, OF PARIS, FRANCE.

DYNAMIC BALANCING-MACHINE.

1,401,838.  Specification of Letters Patent.  Patented Dec. 27, 1921.

Application filed October 13, 1919. Serial No. 330,513.

*To all whom it may concern:*

Be it known that I, RENÉ ALFRED LAURENT VOLET, engineer, citizen of the French Republic, residing at Paris, France, have invented certain new and useful Improvements in Dynamic Balancing-Machines, of which the following is a specification.

This invention relates to adjustable balancing means for machines for determining the modifications to be made in rotating elements for the purpose of balancing them, and it relates more particularly, but not exclusively, to those machines of this general type called "balancing carriers" wherein a kind of clamp suitable for being mounted on the rotating elements is utilized and a mass is so arranged on the said clamp that it can be moved radially relatively to the latter.

The invention has for its main object to make these balancing means so that the determinations to be effected can be accomplished with greater rapidity and with greater accuracy than has been possible heretofore.

Another object of the invention is to provide means whereby it becomes possible to effect the regulation or adjustment for the mechanism, not only when it is not driven, but even during rotation thereof.

Other objects of the invention will become apparent on reference to the specification which describes the invention in connection with the accompanying drawings.

In the drawings:—

Figure 1 shows an embodiment of the preferred form of my invention, partly in elevation and partly in longitudinal section with parts broken away.

Fig. 2 is a horizontal section on the line 2—2 of Fig. 1.

Fig. 3 is a cross section on the line 3—3 of Fig. 1, with certain parts broken away.

Fig. 4 is a cross section on the line 4—4 of Fig. 1.

According to the invention, as illustrated in the accompanying drawings, which latter are given by way of example, an adjustable balancing mass of the type of the so called "balancing carriers" is mounted upon a shaft 0. A body 1 is formed with an outwardly projecting web portion from which laterally extend on opposite sides the sleeve members $1'$ and $1^2$ and the bores of these sleeves also extend continuously through the body 1. The diameter of said bores is sufficient for mounting the body on the shaft 0 and owing to a system of splines, hereinafter more particularly described, said body is forced to rotate with the shaft.

Two pillars 2 and 2 are secured to or formed integral with said body and project upwardly from the latter. These pillars are situated, one at each side of the transverse axis of symmetry, at equal distances from and parallel to said axis. The upper ends of the pillars 2 are rigidly connected by a cross-bar 3.

A screw 4 is trunnioned at its lower end in the body 1, and at its upper end, in said cross-bar 3, and is so arranged that its vertical axis coincides with the transverse axis of symmetry of said body. A heavy plate 5 acts as a nut on said screw and is also provided with apertures which engage the pillars 2 whereby the latter act as guides for said plate.

A gear 6 is keyed on a portion of the lower end of the screw 4. Spindles $8'$ and $8^2$ are journaled in spaced bearings formed in the sleeves $1'$ and $1^2$, and a laterally extending flange formed on the web portion of the body 1. Two spur pinions $6'$ and $6^2$ are keyed to the spindles $8'$ and $8^2$ and are adapted to mesh with the gear 6. Two beveled pinions $7^{10}$ and $7^{20}$ are mounted loosely on the shaft and are located respectively adjacent the sleeves $1'$ and $1^2$. These beveled pinions are provided with laterally projecting hubs $7'$ and $7^2$ which are utilized as brake pulleys. On the spindles $8'$ and $8^2$ are also secured beveled gears $8^{10}$ and $8^{20}$ adapted to mesh with the beveled pinions $7^{10}$ and $7^{20}$ respectively.

These various elements are assembled and the whole is mounted in a frame 9 supported on the rotating shaft 0.

Two brake blocks $10'$ and $10^2$ adapted, respectively, to engage the hubs $7'$ and $7^2$ are carried by levers pivotally mounted on the frame 9, and springs $10^{20}$ normally press said levers to inoperative position (see Fig. 4). However, by simply pressing with the finger, on either one or the other of said levers the tension of the spring may be overcome and the corresponding brake block caused to engage the hub $7'$ or the hub $7^2$. The application of one or the other of said brake blocks while the shaft is rotating causes the rotation of screw 4 in one or the other direction and therefore the heavy plate 5 is moved toward or away from the body 1.

The body 1 may be keyed directly on the shaft 0 but I prefer to interpose between the body and the shaft a sleeve 11. This sleeve is journaled in spaced bearings on the frame 9 and extends slightly beyond these bearings. The sleeve 11 is keyed to shaft 0 by the key 0° and is adapted to slide longitudinally in its bearings in the frame 9. Between the spaced bearings, the sleeve 11 is provided with a helical groove 11°. One of the extending ends of the sleeve is formed with circular rack teeth 11°° adapted to mesh with a pinion 13 secured to a shaft mounted in ears 9° projecting from the frame 9. A milled button 13° is secured to one end of this shaft for operating the same and the pinion 13. The upper surface of the button 13° is graduated and a pointer mounted on the frame 9 coöperates with said graduations to indicate the longitudinal position of the sleeve 11. One of the ears 9° forms a split bearing for the shaft of gear 13, and a screw 9° is provided for binding the split bearing on the screw and thereby locking the gear 13 in adjusted position. A nipple 12 is screwed into the body 1, or one of its sleeves, at any suitable point so as to project radially into the helical groove 11° whereby longitudinal movement of the sleeve 11 causes a movement of rotation to be imparted into the body 1.

I also provide means whereby the frame 9 and the assembled parts of the mechanism may be moved horizontally along the body of the machine and for this purpose a bar 14 extends parallel to the shaft 0 and is fixed in bearings (not shown) provided on the frame-work of the machine. A toothed rack is cut on this bar and a pinion 15 engaging with the rack is secured to one end of a shaft which is rotatably mounted in an extension of the frame 9, this extension having a socket portion embracing the bar 14. A milled button 15° is secured to the upper end of this shaft and can be readily manipulated for operating the pinion 15 and thus sliding the body 1 and frame 9 longitudinally on the shaft 0.

For reading the position of the plate 5, graduations are provided on one of the pillars 2 and on a disk 4° secured to the upper end of the screw 4. The graduations on the milled head 13° indicate the angle of keying of the body 1 on the shaft.

It will be understood that the particular construction described and shown has been chosen for illustrative purposes merely and that the invention as defined by the claims hereunto appended may be otherwise embodied and applied without departing from the spirit of the scope thereof.

What I claim as my invention and desire to secure by Letters patent, is:—

1. An adjustable balancing means comprising in combination, a frame, a shaft rotatably mounted in said frame, a body adapted to rotate with said shaft, a mass movable radially on said body, means for actuating said mass including gearing rotatable as a unit with said body, and a pair of brake elements each movable into engagement with some of said gears whereby the actuation of one of said brake elements causes said mass to move radially in one direction and the actuation of the other brake element causes the reverse movements thereof.

2. An adjustable balancing means comprising in combination, a frame, a shaft rotatably mounted in the frame, a body adapted to rotate with said shaft, a mass movable radially on said body, means for actuating said mass including gearing rotatable as a unit with said body, some of said gears having extending hubs, and brakes carried by the frame and engageable with said hubs, whereby the actuation of one of said brakes causes the said mass proper to move radially in one direction and the actuation of the other brake causes the reverse movement thereof.

3. An adjustable balancing means comprising in combination, a frame, a shaft rotatably mounted in said frame, a body adapted to rotate with said shaft, a screw rotatably supported on said body so that its axis extends in a radial direction, a plate engaging said screw, a guide preventing said plate from participating in the rotation of the screw, a gear keyed to the screw, bevel pinions loosely mounted on the shaft having hub extensions, gearing connecting said bevel pinions and said gear, brakes carried by the frame and adapted, when actuated, to engage said hubs respectively, whereby, when one of said brakes is actuated, the movement of the corresponding hub is arrested for creating a relative movement between said bevel pinion thus braked and said gearing for actuating said screw.

4. An adjustable balancing means comprising in combination, a frame, a shaft rotatably mounted in said frame, a body keyed for rotation with, and angularly adjustable on said shaft, a mass movable radially on said body, means interposed between said shaft and mass whereby said mass may be moved at will in either direction, and means for changing at will the angle of adjustment of the body on the shaft.

5. An adjustable balancing means comprising in combination, a frame, a shaft rotatably mounted in the frame, a body keyed for rotation with, and angularly adjustable on said shaft, a sleeve interposed between said body and shaft having a helical groove formed therein, means for moving said sleeve longitudinally at will, means carried by said body and engaging said groove whereby the longitudinal movement of the sleeve changes the angle of adjustment of said body, on said shaft and releasable means for locking the sleeve in adjusted position.

6. An adjustable balancing means comprising, in combination a rotatable shaft, a frame adapted to be moved longitudinally on said shaft, a mass movable radially on said body, a sleeve keyed to said shaft having a helical groove formed therein, a body mounted on said sleeve having a projection adapted to engage said groove, means for moving the mass at will in either direction, means for moving the sleeve longitudinally for changing at will the angle of adjustment of the body on the shaft, and mechanism for sliding the frame longitudinally on said shaft.

7. An adjustable balancing means comprising in combination a shaft, a body adapted to rotate with the shaft, a mass radially movable on the body, means for adjusting the mass radially, mechanism for adjusting the angular position of the body on the shaft, and indicating means associated with said means, said mechanism and relatively fixed portions of the apparatus whereby at the end of each determination, the exact radial position assumed by the mass and the angularity of the body on the shaft can be readily ascertained.

In testimony whereof I have hereunto set my hand in presence of two subscribing witnesses.

RENÉ ALFRED LAURENT VOLET.

Witnesses:
CHAS. P. PRESSLY,
PAUL BLUM.